(12) United States Patent
Eck et al.

(10) Patent No.: US 6,569,939 B2
(45) Date of Patent: May 27, 2003

(54) POLYMER COMPOSITION FOR FLEXIBILIZING BUILDING MATERIALS

(75) Inventors: Herbert Eck, Bad Tölz (DE); Klaus Adler, Burghausen (DE); Hermann Lutz, Emmerting (DE); Heinrich Hopf, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/799,240

(22) Filed: Mar. 5, 2001

(65) Prior Publication Data

US 2001/0034391 A1 Oct. 25, 2001

(30) Foreign Application Priority Data

Mar. 6, 2000 (DE) .......................... 100 10 860

(51) Int. Cl.$^7$ .......................... C08L 83/04; C08L 27/22; B01F 17/54
(52) U.S. Cl. .............................. 524/588; 524/5; 524/8; 524/27; 524/262; 524/266; 524/315; 524/457; 524/458; 524/459; 524/460; 524/506; 524/539; 524/650; 516/53; 516/55; 516/67; 516/72; 516/75; 516/906; 516/914; 516/917; 516/DIG. 4; 516/DIG. 5; 516/DIG. 6; 516/DIG. 7; 525/102
(58) Field of Search .................. 524/5, 8, 27, 262, 524/266, 315, 457, 458, 459, 460, 506, 539, 588, 650; 516/53, 55, 67, 72, 75, 906, 914, 917, DIG. 4, DIG. 5, DIG. 6, DIG. 7; 525/102

(56) References Cited

U.S. PATENT DOCUMENTS

| | | | | |
|---|---|---|---|---|
| 3,997,306 A | * | 12/1976 | Hedden | 106/238 |
| 4,455,343 A | * | 6/1984 | Temple | 427/212 |
| 4,477,496 A | * | 10/1984 | Das et al. | 427/375 |
| 4,548,842 A | * | 10/1985 | Pohl | 427/387 |
| 5,258,443 A | * | 11/1993 | Nield et al. | 427/428 |
| 5,681,892 A | | 10/1997 | Weidner et al. | |
| 5,753,733 A | * | 5/1998 | Eck et al. | 524/265 |

FOREIGN PATENT DOCUMENTS

| | | |
|---|---|---|
| CA | 1 340 267 | 12/1998 |
| EP | 0 590 660 | 4/1994 |
| EP | 0 754 737 | 1/1997 |
| EP | 0 857 772 | 8/1998 |
| WO | 97/44289 | 11/1997 |

OTHER PUBLICATIONS

English Derwent Abstract AN 1998–416000 [36] corresponding to EPO 857 772.
English Derwent Abstract AN 1994–111125 [14] corresponding to EPO 590 660.
English Derwent Abstract AN 1998–010058 [02] corresponding to WO 97/44289.

\* cited by examiner

Primary Examiner—Robert Dawson
Assistant Examiner—Jeffrey B. Robertson
(74) Attorney, Agent, or Firm—Brooks & Kushman P.C.

(57) ABSTRACT

The invention provides a polymer composition for flexibilizing building materials, in the form of their aqueous dispersion or of powder redispersible in water, containing a) at least one water-insoluble, film-forming polymer of one or more ethylenically unsaturated monomers capable of free radical polymerization, b) at least one compound from the group consisting of the water-soluble polymers of one or more ethylenically unsaturated monomers capable of free radical polymerization, and the ionic and nonionic emulsifiers, and c) a mixture of at least two organosilicon compounds, at least one of which is an amino-functional organosilicon compound present in salt form.

26 Claims, No Drawings

POLYMER COMPOSITION FOR FLEXIBILIZING BUILDING MATERIALS

BACKGROUND OF THE INVENTION

1) Field of the Invention

The invention relates to polymer compositions in the form of their aqueous dispersions or powders redispersible in water, processes for their preparation and their use for flexibilizing building materials, in particular sealing slurries.

2) Background Art

It is known that the extensibility of building materials can be improved by adding aqueous dispersions of thermoplastics. For example, flexible sealing slurries as used for sealing concrete consist of sand, cement, water and a thermoplastic polymer dispersed therein. The procedure adopted to date was to attempt to improve resilience by changing the polymer composition of the thermoplastics. WO-A 97/44289 teaches the use of copolymers based on vinyl acetate/ethylene copolymers which have a proportion of long-chain, optionally branched vinyl esters for improving the flexibilization. EP-A 857772 proposes, for improving the resilience of cement-free joint sealing compounds, modifying them with a mixture of thermoplastics and alkylalkoxysilanes. EP-A 590660 teaches that the water repellency of cement-free sealing compounds can be improved by adding thermoplastic polymers and branched organopolysiloxanes.

It was the object of the invention to develop a polymer composition by means of which, independently of the composition of the thermoplastic polymer, effective flexibilization of building materials, in particular of cement-containing building materials, is obtained.

SUMMARY OF THE INVENTION

The invention relates to a polymer composition for flexibilizing building materials, in the form of their aqueous dispersion or of powder redispersible in water, containing:
a) at least one water-insoluble, film-forming polymer of one or more ethylenically unsaturated monomers capable of free radical polymerization,
b) at least one compound from the group consisting of the water-soluble polymers of one or more ethylenically unsaturated monomers capable of free radical polymerization, and the ionic and nonionic emulsifiers, and
c) a mixture of at least two organosilicon compounds, at least one of which is an amino-functional organosilicon compound present in salt form.

DESCRIPTION OF THE PREFERRED EMBODIMENTS

Suitable water-insoluble, film-forming polymers contain one or more monomer units from the group consisting of the vinyl esters of straight-chain or branched alkanecarboxylic acids having 1 to 15 C atoms, the methacrylates and acrylates of straight-chain or branched alcohols having 1 to 12 C atoms, the dienes, such as butadiene or isoprene, the olefins, such as ethene or propene, the vinylaromatics, such as styrene, methylstyrene or vinyltoluene, and the vinyl halides, such as vinyl chloride. Water-insoluble is to be understood as meaning that the solubility of the polymers under standard conditions is less than 1 g per liter of water. For film formation, in general the polymer composition is chosen so that film formation takes place at the processing temperature, preferably so that a glass transition temperature Tg of from −30° C. to +80° C. results.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 5 to 11 C atoms, for example VeoVa9® or VeoVa10® (trade names of Shell). Vinyl acetate is particularly preferred.

Preferred methacrylates or acrylates are methyl acrylate, methyl methacrylate, ethyl acrylate, ethyl methacrylate, propyl acrylate, propyl methacrylate, n-butyl acrylate, tert-butyl acrylate, n-butyl methacrylate, tert-butyl methacrylate and 2-ethylhexyl acrylate. Methyl acrylate, methyl methacrylate, n-butyl acrylate and 2-ethylhexyl acrylate are particularly preferred.

If required, from 0.05 to 10% by weight, based on the total weight of the monomer mixture, of auxiliary monomers may also be copolymerized. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid, such as the diethyl and diisopropyl esters; and maleic anhydride; ethylenically unsaturated sulfonic acids and their salts, preferably vinylsulfonic acid or 2-acrylamido-2-methylpropanesulfonic acid. Other examples are precrosslinking comonomers, such as polyethylenically unsaturated comonomers, for example divinyl adipate, diallyl maleate, allyl methacrylate or triallyl cyanurate, or post crosslinking comonomers, for example acrylamidoglycolic acid (AGA), methyl methacrylamidoglycolate (MAGME), N-methylolacrylamide (NMA), N-methylolmethacrylamide, N-methylolallyl-carbamate, alkyl ethers, such as isobutoxy ether, or esters of N-methylolacrylamide, of N-methylolmethacryl-amide and of N-methylolallylcarbamate. Further examples are silicon-functional comonomers, such as acryloyloxypropyltri(alkoxy)- and methacryloyloxy-propyltri(alkoxy)silanes, vinyltrialkoxysilanes and vinylmethyldialkoxysilanes, it being possible, for example, for ethoxy and ethoxypropylene glycol ether radicals to be present as alkoxy groups.

The following are preferred as component a):
From the group consisting of the vinyl ester polymers, vinyl acetate polymers;
vinyl ester/ethylene copolymers, such as vinyl acetate/ethylene copolymers having an ethylene content of preferably from 1 to 60% by weight;
vinyl ester/ethylene/vinyl chloride copolymers having an ethylene content of preferably from 1 to 40% by weight and a vinyl chloride content of preferably from 20 to 90% by weight, vinyl acetate and/or vinyl propionate and/or one or more copolymerizable vinyl esters, such as vinyl laurate, vinyl pivalate, vinyl 2-ethylhexanoate, vinyl esters of an alpha-branched carboxylic acid, in particular vinyl versatate, preferably being present as vinyl esters;
vinyl acetate copolymers with preferably from 1 to 50% by weight of one or more copolymerizable vinyl esters, such as vinyl laurate, vinyl pivalate, vinyl 2-ethylhexanoate, vinyl esters of an alpha-branched carboxylic acid, in particular vinyl versatate (VeoVa9®, VeoVa10®), which, if required, may also contain from 1 to 40% by weight of ethylene;
vinyl ester/acrylate copolymers with preferably from 30 to 90% by weight of vinyl esters, in particular vinyl acetate, and preferably from 1 to 60% by weight of acrylates, in particular n-butyl acrylate or 2-ethylhexyl acrylate, which, if required, may also contain from 1 to 40% by weight of ethylene;

vinyl ester/acrylate copolymers with preferably from 30 to 75% by weight of vinyl acetate, from 1 to 30% by weight of vinyl laurate or vinyl esters of an alpha-branched carboxylic acid, in particular vinyl versatate, preferably from 1 to 30% by weight of acrylates, in particular n-butyl acrylate or 2-ethylhexyl acrylate, which, if required, may also contain from 1 to 40% by weight of ethylene.

From the group consisting of the (meth)acrylic acid polymers, polymers of n-butyl acrylate or 2-ethylhexyl acrylate; copolymers of methyl methacrylate with n-butyl acrylate and/or 2-ethylhexyl acrylate.

From the group consisting of the vinyl chloride polymers, vinyl chloride/ethylene copolymers and vinyl chloride/acrylate copolymers in addition to the above-mentioned vinyl ester/vinyl chloride/ethylene copolymers.

From the group consisting of the styrene polymers, styrene/1,3-butadiene copolymers and styrene/acrylate copolymers, such as styrene/methyl methacrylate/n-butyl acrylate, styrene/n-butyl acrylate or styrene/2-ethylhexyl acrylate having a styrene content of preferably from 1 to 70% by weight in each case.

Preferably used components b) are water-soluble protective colloids, which, if required, are functionalized with hydroxyl groups, mercapto groups, carboxyl groups, amino groups or carbonyl groups. Water-soluble is to be understood as meaning that the solubility under standard conditions is more than 10 g per liter. Suitable protective colloids are commercially available. Examples of suitable protective colloids are polyvinyl alcohols containing from 75 to 100 mol %, preferably from 78 to 95 mol %, of vinyl alcohol units and having a molecular weight of preferably 5000 to 200,000; polyvinylpyrrolidones having a K value of from 10 to 120; polysaccharides in water-soluble form, such as starches (amylose and amylopectin), celluloses and their carboxymethyl, methyl, hydroxyethyl and hydroxypropyl derivatives; proteins, such as casein, soybean protein and gelatin; ligninsulfonates; synthetic polymers, such as poly(meth)acrylic acid, poly(meth)acrylamide, polyvinylsulfonic acids and their water-soluble copolymers; melamine formaldehyde sulfonates, naphthalene formaldehyde sulfonates and styrene/maleic acid and vinyl ether/maleic acid copolymers. If the functional groups are not in any case already contained in the protective colloids, the latter can also be subsequently functionalized. Polyvinyl alcohols functionalized with mercapto groups, carboxyl groups, amino groups or carbonyl groups are also obtainable by copolymerization of correspondingly functionalized comonomers with vinyl acetate and subsequent hydrolysis in a manner known to those skilled in the art.

Emulsifiers suitable as component b) are ionic or nonionic emulsifiers or mixtures thereof, for example:

1) Alkylsulfates, in particular those having a chain length of from 8 to 18 C atoms, alkyl and alkylaryl ether sulfates having 8 to 18 C atoms in the hydrophobic radical and 1 to 50 ethylene oxide units.

2) Sulfonates, in particular alkanesulfonates having 8 to 18 C atoms, alkylarylsulfonates having 8 to 18 C atoms, esters and monoesters of sulfosuccinic acid with monohydric alcohols or alkylphenols having 4 to 15 C atoms in the alkyl radical; if required, these alcohols or alkylphenols may also be ethoxylated with from 1 to 40 ethylene oxide units.

3) Partial esters of phosphoric acid and their alkali metal and ammonium salts, in particular alkyl and alkylaryl phosphates having 8 to 20 C atoms in the organic radical, alkyl ether phosphates and alkylaryl ether phosphates having 8 to 20 C atoms in the alkyl and alkylaryl radical and 1 to 50 EO units.

4) Alkyl polyglycol ethers, preferably having 8 to 40 EO units and alkyl radicals having 8 to 20 C atoms.

5) Alkylaryl polyglycol ethers, preferably having 8 to 40 EO units and 8 to 20 C atoms in the alkyl and aryl radicals.

6) Ethylene oxide/propylene oxide (EO/PO) block copolymers, preferably having from 8 to 40 EO and PO units.

Particularly preferred components b) are the stated polyvinyl alcohols, starches, celluloses, casein, melamine formaldehyde sulfonates, naphthalene formaldehyde sulfonates and, from the group consisting of the functionalized protective colloids, the polyvinyl alcohols functionalized with carboxyl groups, acetoacetyl groups or amino groups, and the carboxymethyl-substituted starches and celluloses.

The polymer composition contains in general from 1 to 50% by weight, preferably from 5 to 30% by weight, of the component b), based on component a).

The organosilicon compounds suitable as component c) are compounds comprising units of the general formula (I) $R^1_a(OR^2)_b SiO_{(4-a-b)/2}$, in which $R^1$ is hydrogen or a monovalent hydrocarbon radical optionally substituted by halogen atoms, in particular by amino groups; $R^2$ is hydrogen, an alkali metal atom or a monovalent hydrocarbon radical optionally substituted by halogen atoms, in particular by amino groups, a has the value 0 to 4 and b has the value 0 to 4, with the proviso that the sum of a and b is less than or equal to 4. These are silanes if a+b=4; organopolysiloxanes if a+b≦3; silicic acid esters if a=0.

Examples of the optionally substituted hydrocarbon radical $R^1$ are hydrocarbon radicals having 1 to 20 carbon atoms, hydrocarbon radicals having 1 to 8 carbon atoms being particularly preferred, especially the methyl, ethyl and isooctyl radical.

Examples of amino-substituted hydrocarbon radicals $R^1$ are those whose amino substituents have the general formula (II) $R^3_2NR^4$—, in which $R^3$ is hydrogen or a monovalent, optionally amino-substituted hydrocarbon radical having 1 to 20, in particular having 1 to 8, carbon atoms, and $R^4$ is a divalent hydrocarbon radical having 1 to 20, in particular having 1 to 8, carbon atoms. Examples of radical $R^3$ are the examples, stated for radical $R^1$, for hydrocarbon radicals and hydrocarbon radicals substituted by amino groups, such as aminoalkyl radicals, the aminoethyl radical being particularly preferred. Preferably, at least one hydrogen atom is bonded to each nitrogen atom in the radicals of the general formula (II).

Preferably, radical $R^4$ is a divalent hydrocarbon radical having 1 to 10 carbon atoms, particularly preferably 1 to 4 carbon atoms, in particular the n-propylene radical. Examples of radical $R^4$ are the methylene, ethylene, propylene, butylene, cyclohexylene, octadecylene, phenylene and butenylene radical.

Examples of amino-substituted hydrocarbon radicals $R^1$ are $H_2N(CH_2)_3$—, $H_2N(CH_2)_2NH(CH_2)_2$—, $H_2N(CH_2)_2NH(CH_2)_3$—, $H_2N(CH_2)_2$—, $H_3CNH(CH_2)_3$—, $C_2H_5NH(CH_2)_3$—, $H_3CNH(CH_2)_2$—, $C_2H_5H(CH_2)_2$—, $H_2N(CH_2)_4$—, $H_2N(CH_2)_5$—, $H(NHCH_2CH_2)_3$—, $C_4H_9NH(CH_2)_2NH(CH_2)_2$—, cyclo-$C_6H_{11}NH(CH_2)_3$—, cyclo-$C_6H_{11}NH(CH_2)_2$—, $(CH_3)_2N(CH_2)_3$—, $(CH_3)_2N(CH_2)_2$—, $(C_2H_5)_2N(CH_2)_3$—, and $(C_2H_5)_2N(CH_2)_2$—.

Examples of monovalent hydrocarbon radical $R^2$ optionally substituted by amino groups are the examples stated above for $R^1$. Preferred hydrocarbon radicals $R^2$ are alkyl radicals having 1 to 20 carbon atoms, alkyl radicals having 1 to 8 carbon atoms, being particularly preferred, especially the methyl, ethyl, propyl and isooctyl radical.

Preferred organosilicon compounds are alkali metal siliconates comprising from 1 to 5 units of the general formula (I), in which $R^1$ is an alkyl radical optionally substituted by amino groups and having 1 to 6 carbon atoms, in particular a methyl, ethyl, n-propyl and isopropyl radical, $R^2$ is hydrogen, sodium or potassium, and a has the value 1 or 2, preferably 1, and b has the value 1, 2 or 3, and from 30 to 70 mol % of the radicals $R^2$ are sodium or potassium.

Preferred silanes of the general formula (I) are those in which $R^1$ is a monovalent hydrocarbon radical having 1 to 15 carbon atoms, preferably substituted by amino groups, $R^2$ is an alkyl radical having 1 to 6 carbon atoms, in particular a methyl, ethyl, n-propyl and isopropyl radical, and a is 1 or 2, preferably 1, and b is 2 or 3, preferably 3. N-(2-Aminoethyl)-3-aminopropylmethyldimethoxysilane, N-(2-aminoethyl)-3-aminopropyltrimethoxysilane, isooctyltrimethoxy-silane and isooctyltriethoxysilane are particularly preferred.

Other preferred organosilicon compounds are silicic acid esters of the general formula (I), in which a has the value 0. Preferred silicic acid esters contain alkoxy radicals having 1 to 3 carbon atoms and have a viscosity of from 1 to 5 $mm^2/s$ at 25° C. Examples of preferred silicic acid esters are tetramethyl silicate, tetraethyl silicate and tetraisopropyl silicate.

Preferred examples of organosiloxanes of the general formula (I) are organopolysiloxanes, such as methylethoxypolysiioxanes, preferably of the empirical formula $CH_3Si(OC_2H_5)_{0.8}O_{1.1}$, phenylethoxypolysiloxanes, preferably having the empirical formula $C_6H_5Si(OC_2H_5)_{0.72}O_{1.14}$, and isooctylmethoxypolysiloxanes, preferably having the empirical formula $(C_8H_{17}SiO_{3/2})(CH_3SiO_{3/2})_{1.8}(CH_3O_{1/2})_{3.4}$, those having a viscosity of from 5 to 500 $mm^2/s$ at 25° C. being particularly preferred.

Further preferred examples of organosiloxanes of the general formula (I) are branched organosiloxanes which contain exclusively alkyl radicals having 1 to 12 carbon atoms as radicals $R^1$. Further preferred examples of organosiloxanes of the general formula (I) are organosiloxane resins. Preferably, a then has a value of from 0.8 to 1.8, in particular from 1.0 to 1.7; b then preferably has a value of from 0 to 0.5 and the sum of a+b has a maximum value of 1.9. A preferred example of an organosiloxane resin is the resin of the empirical formula $MeSiO_{1.48}(OEt)_{0.04}$.

Preferred examples of aminofunctional organosiloxanes of the general formula (I) are organopolysiloxanes of the general formula (III) $R^5_cR^6_d(OR^7)_eSiO_{(4-c-d-e)/2}$, in which $R^5$ is a monovalent hydrocarbon radical having 1 to 10 carbon atoms, $R^6$ is a monovalent amino-substituted hydrocarbon radical having 1 to 10 carbon atoms, $R^7$ is a monovalent alkyl radical having 1 to 6 carbon atoms and c=0 to 3, d=0 to 3 and e=0 to 3, with the proviso that d is on average at least 0.05, the sum of c, d and e is less than or equal to 3 and the radical $R^6$ is present in amounts corresponding to more than 0.5% by weight of basic nitrogen per organopolysiloxane molecule. Examples of hydrocarbon radicals $R^5$ and amino-substituted hydrocarbon radicals $R^6$ and preferred hydrocarbon radicals $R^5$ and amino-substituted hydrocarbon radicals $R^6$ are mentioned above for the radicals $R^1$ and $R^2$.

The amino-substituted organosilicon compounds are used in salt form. All water-soluble organic and inorganic acids are suitable for the preparation of the salt. Examples of such acids are hydrochloric, sulfuric, phosphoric, acetic and propionic acid. Acetic acid and propionic acid are preferred.

The amino-substituted or organosilicon compounds contain in general from 0.1 to 1.0% by weight, preferably from 0.2 to 0.6% by weight, of nitrogen, based in each case on the total weight of the amino-substituted organosilicon compound. The amount of the component c) in the polymer composition is from 0.1 to 10% by weight, preferably from 0.5 to 5% by weight, based in each case on the total weight of the polymer composition, with the proviso that the content of amino-substituted organosilicon compound is so high that the amount of nitrogen does not fall below 0.1% by weight, based on the total weight of the component c).

The water-insoluble polymers a) are preferably prepared by the emulsion polymerization process. This is carried out in an open reaction vessel or in pressure-resistant vessels, in a temperature range from 0° C. to 100° C., and is initiated by means of the conventional free radical formers, which are preferably used in amounts of from 0.01 to 3.0% by weight, based on the total weight of the monomers. The preparation is preferably carried out in the presence of the above-mentioned protective colloids. If required, the above-mentioned emulsifiers can be used in the emulsion polymerization. In a preferred embodiment, polymerization is effected without the addition of emulsifier. The pH range desired for the polymerization is in general from 2.5 to 10, preferably from 3 to 8. In order to establish the molecular weight, the regulators usually used may be added during the polymerization. Regardless of the polymerization process chosen, the polymerization can be carried out batchwise or continuously, with or without the use of seed latices, with initial introduction of all or individual components of the reaction mixture, or with partial initial introduction and subsequent metering of the or individual components of the reaction mixture, or by the feed process without initial introduction. The solids content of the dispersion thus obtainable is from 20 to 70%. The mean particle size is from 0.1 to 10 $\mu m$, preferably from 0.2 to 5 $\mu m$.

The drying of the dispersion can be carried out by means of spray-drying, freeze-drying or fluidized-bed drying. Spray-drying in conventional spray-drying units is preferred, it being possible to effect the atomization by means of airless high-pressure nozzles, binary nozzles or multimaterial nozzles or with a rotating disk. The outlet temperature is in general in the range from 55° C. to 100° C., preferably from 65° C. to 90° C., depending on the unit, the Tg of the resin and the desired degree of drying. For spray-drying, the dispersion of the polymer a) having a solids content of preferably from 20% to 60% is sprayed and dried together with protective colloids as an atomization aid. The protective colloids used may be the above-mentioned water-soluble polymers b), it being possible to add the protective colloids to the aqueous dispersion before the spray-drying, in the form of an aqueous solution. In this process step, preferably from 5 to 20% by weight of water-soluble polymer b), based on polymer a), are added.

For the preparation of the polymer composition, said water-soluble polymers b) can be added as protective colloids during the polymerization of the polymer a), or can be added as an atomization aid prior to the spraying of the aqueous dispersion of the polymer a), or some of it can be added during the polymerization and the remainder before the spraying. Said emulsifiers suitable as component b) are added in general during the polymerization of the polymer a).

The organosilicon component c) can be added to the aqueous dispersion containing the components a) and b) and this mixture can be dried in order to obtain a pulverulent polymer composition. In another possible procedure, the organosilicon compound may be mixed and dried with a pulverulent carrier material and this powder can be mixed with the components a) and b). The organosilicon component c) can also be mixed with an aqueous solution of the water-soluble polymers b), then sprayed and finally mixed with the component a).

If required, the polymer composition can also be modified with further additives. Examples of these are antiblocking agents, dyes, pigments, plasticizers, film formation assistants, antifoams, catalysts, rheology assistants, thickeners, adhesion-promoting agents and emulsifiers.

The polymer composition can be used in the applications typical for them, for example in chemical products for the construction industry in combination with inorganic, hydraulically setting binders, such as cement, gypsum and waterglass. Further examples are the use in cement-containing and cement-free construction adhesives, renders, filling compounds, floor filling compounds, joint mortars and paints.

The use of the polymer composition in cement-containing sealing slurries is particularly preferred. A dry formulation typical for sealing slurries is, for example:

from 10 to 50 parts by weight of cement,
from 10 to 50 parts by weight of quartz sand,
from 1.0 to 10 parts by weight of fibers,
from 0.1 to 1.0 part by weight of cement plasticizer and
from 0.1 to 1.0 part by weight of antifoam.

The polymer composition is preferably used in an amount of from 10 to 50% by weight, based on the total weight of the dry formulation. The ready-to-use sealing slurry is prepared by stirring with water, the amount of water preferably being such that from 25 to 60 parts by weight of water are used per 100 parts by weight of dry formulation. If the polymer composition is used in the form of an aqueous dispersion, the dispersion can be mixed by means of the compulsory-type mixers for mortar mixing which are customary in the construction industry. In an expedient procedure, the dispersion is diluted with the required amount of mixing water and the mixture of cement and aggregates and, if required, further additives is added. When used in the form of a powder, the pulverulent polymer composition is mixed with the components of the dry formulation and this mixture is stirred with the calculated amount of mixing water.

With the polymer composition according to the invention, it was surprisingly found that, owing to the content of aminofunctional organosilicon compound not only is water repellency of the materials thus modified obtained but, particularly when used in sealing slurries, a considerable improvement in the elastic properties is obtained, the greater extensibility after wet storage being particularly noteworthy.

The Examples below serve for further illustrating the invention: Component a) and component b) were used in the form of the following substrates:

Dispersion 1:

Aqueous dispersion having a solids content of 50% by weight of a vinyl acetate/ethylene copolymer containing 75% by weight of vinyl acetate and 25% by weight of ethylene and having a Tg of −7° C., which also contained 5% by weight of polyvinyl alcohol having a degree of hydrolysis of 88% and a Höppler viscosity of 4 mPas (4% strength solution in water at 20° C.).

Dispersion 2:

Aqueous dispersion having a solids content of 50% by weight of a vinyl acetate/ethylene/VeoVa10 copolymer having a Tg of −15° C., which also contained 3.5% by weight of polyvinyl alcohol having a degree of hydrolysis of 88% and a Höppler viscosity of 4 mPas (4% strength solution in water at 20° C.).

Dispersion 3:

Aqueous dispersion having a solids content of 50% by weight of a styrene/n-butyl acrylate copolymer containing 31% by weight of styrene and 69% by weight of n-butyl acrylate and having a Tg of −5° C., which also contained 3.5% by weight of nonylphenol ether/nonylphenol ether sulfonate emulsifier.

Dispersion powder 4:

For the preparation of the dispersion powder, 10% by weight, based on polymer, of a polyvinyl alcohol having a degree of hydrolysis of 88 mol % and a Höppler viscosity of 8 mPas were added to the above-mentioned dispersion 2. The mixture was sprayed through a binary nozzle.

Organosilicon Component 1 (SSK 1)

A mixture of 500 g of an α,ω-dihydroxydimethyl-polysiloxane (MW: 4000 g/mol) and 150 g of N-(2-aminoethyl)-3-aminopropyltrimethoxysilane was heated to the boil together with 0.2 g of KOH in 4 g of methanol for 6 hours and then cooled, and 2.5 ml of 10% strength HCl were added at room temperature. Thereafter, the methanol was distilled off and the resulting KCl was filtered off. The nitrogen content was 2.9% by weight. 50 g of the aminosiloxane thus obtained were mixed with 352 g of isooctyltrimethoxysilane, 22.5 g of acetic acid and 225 g of finely divided silica.

Organosilicon Component 2 (SSK 2)

A mixture of 500 g of an α,ω-dihydroxydimethyl-polysiloxane (MW: 4000 g/mol) and 150 g of N-(2-aminoethyl)-3-aminopropyltrimethoxysilane was heated to the boil together with 0.2 g of KOH in 4 g of methanol for 6 hours and then cooled, and 2.5 ml of 10% strength HCl were added at room temperature. Thereafter, the methanol was distilled off and the resulting KCl was filtered off. The nitrogen content was 2.9% by weight. 50 g of the aminosiloxane thus obtained were mixed with 95 g of isooctyltrimethoxysilane, 16 g of methyltrimethoxysilane, 28 g of tetraethoxysilane and 13 g of acetic acid.

The polymer compositions were tested in the following formulation for sealing slurries:

150.0 parts by weight of Portland cement (CEM I 32.5 R)
40.0 parts by weight of thickener (Tixoton CV 15)
10.5 parts by weight of antifoam (Agitan P 800)
260.0 parts by weight of filler (quartz sand No. 12)
10.0 parts by weight of filler (mica 2002)
208.0 parts by weight of $CaCO_3$ filler (Omyacarb 20 BG)
1.0 part by weight of cellulose thickener (Culminal MC 3000)
0.5 part by weight of starch thickener (Amylotex 8100)
20.0 parts by weight of cellulose fibers (Arbocel B 00)

The polymer composition was obtained by mixing the dispersions or dispersion powders stated in Table 1 and the organosilicon component. The polymer composition was then mixed with the amounts, stated in Table 1, of the sealing slurry formulation and water. After a ripening time of 10 minutes, the mortar was mixed for 30 seconds and then applied by means of a trowel in a Teflon template to give a 2 mm thick sealing slurry, removed from the template after drying and then stored according to the data in Table 1.

After storage, dumbbells were punched out of the sealing slurries, and the tensile strength TS ($N/mm^2$) and elongation at break EB (%) of said dumbbells were determined in a tensile test according to DIN 53504 on an Instron tensile tester at a drawing rate of 10 mm/min. The mean values of the individual measurement series are shown in Table 1.

d=storage time in days; SC=storage under standard climatic conditions at 23° C., 50% rel. humidity.

TABLE 1

| Test | T1 | T2 | T3 | T4 | T5 | T6 | T7 |
|---|---|---|---|---|---|---|---|
| Basic mixture [g] | 1000 | 1000 | 1000 | 1000 | 1000 | 1000 | 1000 |
| Dispersion 1 [g] | 400 | 390 | | | | | |
| Dispersion 2 [g] | | | 400 | 395 | | | 390 |
| Dispersion 3 [g] | | | | | 400 | 390 | |
| SSK 1 [g] | | 10 | | | | | 10 |
| SSK 2 [g] | | | | 5 | | 10 | |
| Water [g] | 120 | 120 | 180 | 180 | 180 | 180 | 180 |
| 28d/SC TS in N/mm$^2$ | 1.2 | 1.3 | 0.7 | 0.7 | 1.1 | 2.5 | 0.8 |
| 28d/SC EB in % | 5.7 | 17.9 | 17.4 | 34.1 | 8.3 | 15.0 | 47.1 |

In tests T 1, T 3 and T 5, in each case sealing slurry compositions which had been modified only with component a) and b) of the polymer composition were tested. Tests T 2, T 4, T 6 and T 7 show the results obtained on modification with the polymer composition comprising the components a), b) and c):

The resilience (elongation at break EB) is improved several times over while the mechanical strength (tensile strength TS) is maintained.

What is claimed is:

1. A polymer composition suitable for flexibilizing building materials, said polymer composition comprising at least one of an aqueous polymer dispersion or a redispersible polymer powder prepared therefrom, said polymer comprising:
   a) at least one water-insoluble, film-forming addition polymer of one or more ethylenically unsaturated monomers capable of free radical polymerization, said polymer composition further comprising;
   b) at least one component selected from the group consisting of water soluble protective colloids, ionic emulsifiers and non-ionic emulsifiers;
   c) a first organosilicon compound containing amino-functional silane or siloxy moieties; and
   d) a second organosilicon compound different from said first organosilicon compound, wherein said organosilicon compounds c) and d) are added to said film-forming addition polymer a) following its preparation and wherein amino groups of said organosilicon compounds are present in salt form.

2. The polymer composition of claim 1, wherein said first organosilicon compound comprises a silane, siloxane, polysiloxane, or silicic acid ester comprising units of the general formula

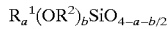

wherein R$^1$ is hydrogen or a monovalentalkyl group optionally substituted by halogen atoms or amino groups, R$^2$ is hydrogen, an alkali metal, or an alkyl group optionally substituted by halogen atoms or amino groups, a and b are integers from 0 to 4 and the sum (a+b) is less than or equal to 4, said first organosilicon compound containing at least one aminoalkyl group.

3. The polymer composition of claim 1, wherein said second organosilicon compound is free of amino groups.

4. The polymer composition of claim 3, wherein said second organosilicon compound is free of amino groups.

5. The polymer composition of claim 1, wherein said film-forming polymer a) comprises an addition polymer containing at least one monomer unit derived from monomers selected from the group consisting of vinyl esters of optionally branched C$_{1-15}$ alkane carboxylic acids, (meth)acrylates of optionally branched C$_{1-12}$ alcohols, monoolefins, dienes, vinylaromatics, and vinyl halides.

6. The polymer composition of claim 1, wherein said film-forming polymer comprises from 30 to 90% by weight of repeating units derived from vinyl acetate.

7. The polymer composition of claim 1, wherein said film-forming polymer comprises a styrene/alkylacrylate copolymer.

8. The polymer composition of claim 1, wherein said film-forming polymer comprises a vinylacetate/ethylene copolymer optionally containing units derived from vinyl esters of C$_{5-11}$ α-branched monocarboxylic acids.

9. The polymer composition of claim 1, wherein at least one protective colloid is selected from the group consisting of polyvinylalcohols, polyvinylpyrrolidones, water soluble cellulose, carboxymethylcellulose, methylcellulose, hydroxyethylcellulose, hydroxypropycellulose, proteins, ligninsulfonates, poly(meth)acrylic acid, poly(meth)acrylamide, polyvinylsulfonic acids and water soluble copolymers thereof, melamine/formaldehyde sulfonates, naphthalene formaldehyde sulfonates, styrene/maleic acid copolymers, and vinyl ether/maleic acid copolymers.

10. The polymer composition of claim 9, wherein at least one polyvinyl alcohol is a polyvinyl alcohol containing from 75 mol percent to 100 mol percent of vinyl alcohol units.

11. The polymer composition of claim 2, wherein at least one of R$^1$ or R$^2$ is an amino-substituted hydrocarbon radical having the general formula R$^3{}_2$NR$^4$—, where R$^3$ is hydrogen or a monovalent, optionally amino-substituted hydrocarbon radical having 1 to 20 carbon atoms and R$^4$ is a divalent hydrocarbon radical having 1 to 20 carbon atoms.

12. The polymer composition of claim 2, wherein at least one radical R$^1$ or R$^2$ is an aminoalkyl radical selected from the group consisting of H$_2$N(CH$_2$)$_3$—, H$_2$N(CH$_2$)$_2$NH(CH$_2$)$_2$—, H$_2$N(CH$_2$)$_2$NH(CH$_2$)$_3$—, H$_2$N(CH$_2$)$_2$—, H$_3$CNH(CH$_2$)$_3$—, C$_2$H$_5$NH(CH$_2$)$_3$—, H$_3$CNH(CH$_2$)$_2$—, C$_2$H$_5$NH(CH$_2$)$_2$—, H$_2$N(CH$_2$)$_4$—, H$_2$N(CH$_2$)$_5$—, H(NHCH$_2$CH$_2$)$_3$—, C$_4$H$_9$NH(CH$_2$)$_2$NH(CH$_2$)$_2$—, cyclo-C$_6$H$_{11}$NH(CH$_2$)$_3$—, cyclo-C$_6$H$_{11}$NH(CH$_2$)$_2$—, (CH$_3$)$_2$N(CH$_2$)$_3$—, (CH$_3$)$_2$N(CH$_2$)$_2$—, (C$_2$H$_5$)$_2$N(CH$_2$)$_3$—, and (C$_2$H$_5$)$_2$N(CH$_2$)$_2$—.

13. The polymer composition of claim 1, wherein organosilicon compound d) comprises units of the general formula (I)

in which R$^1$ is hydrogen or a monovalent hydrocarbon radical optionally substituted by halogen atoms, R$^2$ is hydrogen, an alkali metal atom or a monovalent hydrocarbon radical optionally substituted by halogen atoms, a has the value 0 to 4 and b has the value 0 to 4, with the proviso that the sum of a and b is less than or equal to 4.

14. The polymer composition of claim 13, wherein a compound d) comprises an alkali metal siliconate containing 1 to 5 units of the general formula (I), in which R$^1$ is an optionally amino-substituted alkyl radical having 1 to 6 carbon atoms, R$^2$ is hydrogen, sodium or potassium, a has the value 1 or 2 and b has the value 1, 2 or 3, and from 30 to 70 mol % of the radicals R$^2$ are sodium or potassium.

15. The polymer composition of claim 2, wherein compound c) is a silane wherein R$^1$ is a C$_{1-15}$ hydrocarbon radical optionally bearing one or more amino groups, R$^2$ is a C$_{1-6}$ alkyl radical, a is 1 or 2, and b is 2 or 3, the sum of (a+b) being 4, said silane containing at least one amino group.

16. The polymer composition of claim 1, wherein one or more of organosilicon compound(s) c) are selected from the group consisting of N-(2-aminoethyl)-3-aminopropyl-methyldimethoxysilane and N-(2-aminoethyl)-3-aminopropyltrimethoxysilane.

17. The polymer composition of claim 1, wherein one or more of organosilicon compound(s) d) are selected from the group consisting of isooctyltrimethoxysilane and isooctyltriethoxysilane.

18. The polymer composition of claim 1, wherein one or more of organosilicon compound(s) d) comprise a silicic acid ester.

19. The polymer composition of claim 1, wherein an organosilicon compound d) is selected from the group consisting of methylethoxypolysiloxanes of the empirical formula $CH_3Si(OC_2H_5)_{0.8}O_{1.1}$, phenylethoxypolysiloxanes of the empirical formula $C_6H_5Si(OC_2H_5)_{0.72}O_{1.14}$ and isooctylmethoxypolysiloxanes of the empirical formula $(C_8H_{17}SiO_{3/2})(CH_3SiO_{3/2})_{1.8}(CH_3O_{1/2})_{3.4}$.

20. In a process for flexibilizing a settable construction material comprising an inorganic binder, the improvement comprising adding to said settable construction material at least one polymer composition of claim 1.

21. The process of claim 20, wherein said building material is a hydraulically setting cementitious material.

22. The process of claim 20, wherein said construction material is selected from the group consisting of cement-containing construction adhesives, cement-free construction adhesives, cement-containing sealing slurries, renders, filling compounds, floor filling compounds, joint mortars, and paints.

23. The process of claim 20, wherein said construction material comprises a cement-containing sealing slurry containing from 10 to 50 parts by weight of cement, from 10 to 50 parts by weight of quartz sand, from 1.0 to 10 parts by weight of fibers, from 0.1 to 1.0 part by weight of cement plasticizer, and from 0.1 to 1.0 part by weight of antifoam.

24. A hydraulically setting construction material comprising a cementitious or non-cementitious inorganic binder, and from 10 to 50 percent by weight, based on the weight of dry components of said construction material, of a polymer composition flexibilizer of claim 1.

25. The construction material of claim 24 which is a sealing slurry.

26. The sealing slurry of claim 25, comprising 10 to 50 parts by weight of cement, from 10 to 50 parts by weight of quartz sand, from 1.0 to 10 parts by weight of fibers, from 0.1 to 1.0 part by weight of cement plasticizer and from 0.1 to 1.0 part by weight of antifoam.

* * * * *

UNITED STATES PATENT AND TRADEMARK OFFICE
CERTIFICATE OF CORRECTION

PATENT NO.     : 6,569,939 B2                                              Page 1 of 1
DATED          : May 27, 2003
INVENTOR(S)    : Herbert Eck et al.

It is certified that error appears in the above-identified patent and that said Letters Patent is hereby corrected as shown below:

<u>Column 9,</u>
Line 64, delete "3" and insert therefor -- 2 --.

Signed and Sealed this

Eighteenth Day of November, 2003

JAMES E. ROGAN
*Director of the United States Patent and Trademark Office*